United States Patent
Furukawa et al.

(10) Patent No.: US 8,315,016 B2
(45) Date of Patent: Nov. 20, 2012

(54) HEAD SLIDER, HEAD ASSEMBLY, AND MAGNETIC DISK DEVICE

(75) Inventors: Masaru Furukawa, Fujisawa (JP); Junguo Xu, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 600 days.

(21) Appl. No.: 12/581,268

(22) Filed: Oct. 19, 2009

(65) Prior Publication Data

US 2010/0097716 A1 Apr. 22, 2010

(30) Foreign Application Priority Data

Oct. 20, 2008 (JP) .................................. 2008-270198

(51) Int. Cl.
*G11B 5/02* (2006.01)
(52) U.S. Cl. ................ 360/125.31; 360/125.74; 360/59; 360/128
(58) Field of Classification Search .................... 360/59, 360/122, 128, 125.31, 125.74
See application file for complete search history.

(56) References Cited

U.S. PATENT DOCUMENTS

| | | | |
|---|---|---|---|
| 7,006,336 B2* | 2/2006 | Coffey et al. ................. | 360/313 |
| 7,262,936 B2* | 8/2007 | Hamann et al. ............... | 360/128 |
| 7,382,580 B2* | 6/2008 | Maat ............................. | 360/128 |
| 7,804,743 B2* | 9/2010 | Matsumoto et al. ......... | 369/13.33 |
| 8,102,625 B2* | 1/2012 | Shiramatsu et al. ..... | 360/125.74 |
| 2002/0014575 A1 | 2/2002 | Hatano et al. | |
| 2004/0165311 A1 | 8/2004 | Yamanaka et al. | |
| 2005/0146993 A1 | 7/2005 | Kamimura et al. | |
| 2005/0259343 A1 | 11/2005 | Akagi et al. | |
| 2006/0067001 A1* | 3/2006 | Hsu et al. .................... | 360/234.3 |
| 2007/0070824 A1 | 3/2007 | Nishida et al. | |

FOREIGN PATENT DOCUMENTS

| | | | |
|---|---|---|---|
| JP | 2002-62479 | | 2/2002 |
| JP | 2004-259379 | | 9/2004 |
| JP | 2005-332474 | | 12/2005 |
| JP | 2006139826 A | * | 6/2006 |
| JP | 2006164414 A | * | 6/2006 |
| JP | 2007-122847 | | 5/2007 |
| JP | 2008-010026 | | 1/2008 |
| WO | WO 2004/038715 | | 5/2004 |

* cited by examiner

*Primary Examiner* — Will J Klimowicz
(74) *Attorney, Agent, or Firm* — Antonelli, Terry, Stout & Kraus, LLP.

(57) ABSTRACT

Provided is a head slider that can heat a recording medium with a simple structure. In the head slider (10), a hole portion (14*h*) having an opening in a medium facing surface (10*a*) facing a disk-shaped recording medium (2) is formed, and a heating element (32) that is heated by being energized and a reflection portion (43) for reflecting heat radiated from the heating element (32) toward the disk-shaped recording medium (2) are disposed in the hole portion (14*h*).

19 Claims, 6 Drawing Sheets

HEAD SLIDER, HEAD ASSEMBLY, AND MAGNETIC DISK DEVICE

CROSS-REFERENCE TO RELATED APPLICATION

The present application claims priority from Japanese application JP 2008-270198 filed on Oct. 20, 2008, the content of which is hereby incorporated by reference into this application.

BACKGROUND OF THE INVENTION

1. Field of the Invention

The present invention relates to a head slider, a head assembly, and a magnetic disk device, in particular, a structure of a head slider for realizing thermally assisted magnetic recording.

2. Description of the Related Art

Recently, as one of technologies for improving a recording density of a magnetic disk device, thermally assisted magnetic recording is proposed. The thermally assisted magnetic recording is a technology of recording data by applying magnetic field and heat to the recording medium. Japanese Patent Application Laid-Open No. 2008-10026 discloses a head slider using a laser light source and a near field optical element as means for heating the recording medium.

However, in the conventional head slider described above, the laser light source is disposed between the head slider and a head supporting member, and the near field optical element is disposed on a medium facing surface side. Therefore, it is necessary to form a wave guide for guiding light from the laser light source to the near field optical element in the head slider. As a result, the structure for heating the recording medium becomes inevitably complicated. In addition, because the laser light source is disposed between the head slider and the head supporting member, there is also a problem of heat distortion of the head supporting member due to heating of the laser light source.

SUMMARY OF THE INVENTION

The present invention has been made under the above-mentioned background, and it is an object of the present invention to provide a head slider, a head assembly, and a magnetic disk device that can heat the recording medium with a simple structure.

In order to solve the above-mentioned problems, ahead slider according to the present invention, which is floated above a recording medium, for writing data, includes: a medium facing surface facing the recording medium; a hole portion having an opening in the medium facing surface; a heating element disposed in the hole portion, the heating element being heated through energization; and a reflection portion disposed in the hole portion, the reflection portion reflecting heat radiated from the heating element toward the recording medium.

According to an aspect of the present invention, the reflection portion is formed at least on a farther side from the recording medium with respect to the heating element in the hole portion.

According to an aspect of the present invention, the reflection portion is formed on an inner surface of the hole portion.

According to an aspect of the present invention, the heating element is formed separately from an inner surface of the hole portion.

According to an aspect of the present invention, the reflection portion has a curved reflection surface that condenses the heat radiated from the heating element to an area narrower than the opening of the hole portion.

According to an aspect of the present invention, a reflection surface of the reflection portion forms an elliptic curve on a cross section cut in a plane passing through the heating element and the opening of the hole portion, in which a direction from the heating element to the recording medium corresponds to a major axis direction of the elliptic curve.

According to an aspect of the present invention, an inner surface of the hole portion forms an elliptic curve on a cross section cut in a plane passing through the heating element and the opening of the hole portion, in which a direction from the heating element to the recording medium corresponds to a major axis direction of the elliptic curve, and the reflection portion is formed along the inner surface of the hole portion.

Further, the reflection surface may form the elliptic curve on the cross section cut in the plane passing through the heating element and the opening of the hole portion along a moving direction of the head slider relatively to the recording medium.

Further, the reflection surface may form the elliptic curve on the cross section cut in the plane passing through the heating element and the opening of the hole portion along a direction crossing a moving direction of the head slider relatively to the recording medium.

Further, the reflection surface may be formed into an elliptic cylindrical surface.

Further, the heating element may be disposed at a position of a first focal point determined in the hole portion by the elliptic curve.

Further, a second focal point determined outside the hole portion by the elliptic curve may be positioned on the recording medium.

According to an aspect of the present invention, the hole portion is formed on a front side with respect to a position where data is written in a moving direction of the head slider relatively to the recording medium.

According to an aspect of the present invention, the heating element includes a linear electric heating member including at least parallel portions connected by a folded portion.

According to an aspect of the present invention, the heating element includes a meandering linear electric heating member.

According to an aspect of the present invention, the head slider further includes a thermally transparent member that has thermal transparency for the heat radiated from the heating element and is filled in the hole portion.

A head assembly according to the present invention includes the above-mentioned head slider.

A magnetic disk device according to the present invention includes the above-mentioned head assembly.

According to an aspect of the present invention, the magnetic disk device further includes a disk-shaped recording medium including a low thermal conductivity layer having thermal conductivity lower than thermal conductivity of a magnetic recording layer in which data is written, under the magnetic recording layer.

According to the present invention, the heating element and the reflection portion are disposed in the hole portion that opens in the medium facing surface, and hence the recording medium can be heated by a simple structure. In addition, the heating element is disposed on the medium facing surface side, and hence influence of heat on the head supporting member can be reduced.

BRIEF DESCRIPTION OF THE DRAWINGS

In the accompanying drawings.

DETAILED DESCRIPTION OF THE INVENTION

An embodiment of a head slider, a head assembly, and a magnetic disk device according to the present invention is described with reference to the attached drawings.

Figure 1:
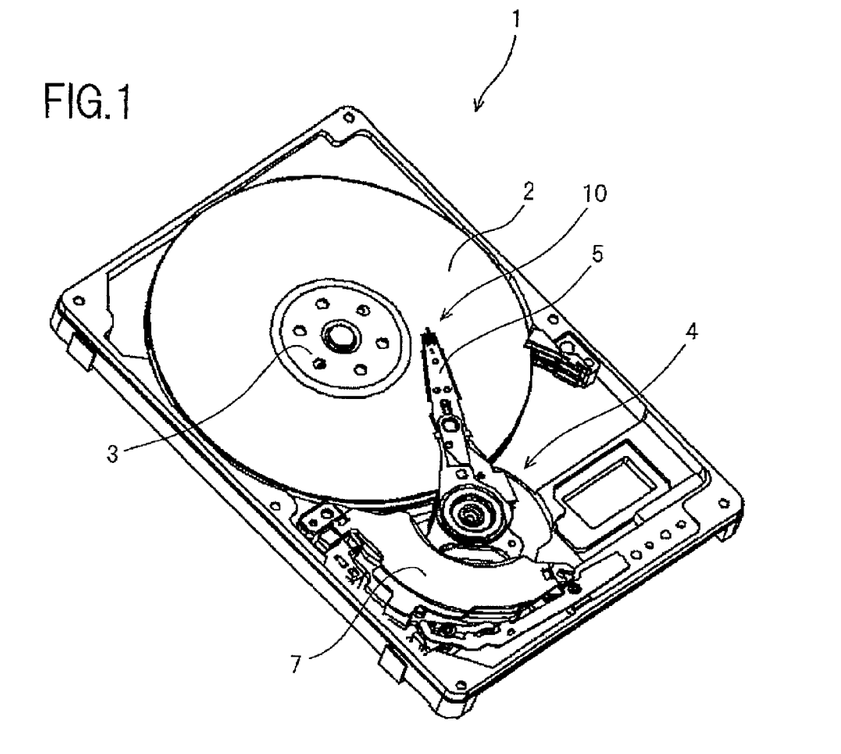
FIG. 1 is a perspective view of a magnetic disk device according to an embodiment of the present invention.

FIG. 1 is a perspective view of a magnetic disk device 1. In FIG. 1, a top cover is omitted. A casing of the magnetic disk device 1 houses a disk-shaped recording medium 2 and a head assembly 4. The disk-shaped recording medium 2 is attached to a spindle motor 3 disposed at a bottom portion of the casing. The head assembly 4 is supported adjacently to the disk-shaped recording medium 2 so as to freely pivot. A suspension arm 5 is provided to the front end side of the head assembly 4, and a head slider 10 is supported by the front end portion of the suspension arm 5. On the other hand, a voice coil motor 7 is provided to the rear end portion of the head assembly 4. The voice coil motor 7 drives the head assembly 4 to pivot, to thereby move the head slider 10 on the disk-shaped recording medium 2 substantially in the radial direction.

Figure 2:
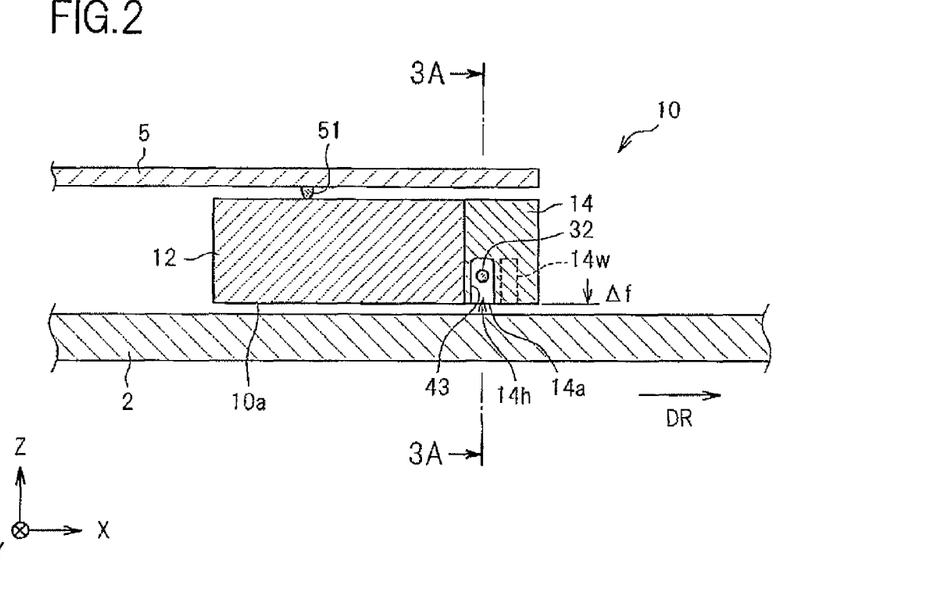
FIG. 2 is a diagram illustrating a schematic cross section of a head slider according to the embodiment of the present invention.

FIG. 2 is a diagram illustrating a schematic cross section of the head slider 10. In FIG. 2, X, Y, and Z directions correspond to the longitudinal direction, the width direction, and the thickness direction of the head slider 10, respectively. Among the directions, the Z direction corresponds to the floating direction of the head slider 10. In addition, the X and Y directions substantially correspond to the rotation direction (i.e., track direction) and the radial direction (i.e., track width direction) of the disk-shaped recording medium 2, respectively.

In addition, the arrow DR of FIG. 2 indicates the rotation direction of the disk-shaped recording medium 2. Therefore, the head slider 10 and the disk-shaped recording medium 2 move relatively to each other along with the rotation direction (X direction).

The head slider 10 is supported by the suspension arm 5 at the front end portion thereof via a dimple 51. The head slider 10 includes a medium facing surface 10a, that is an air bearing surface (ABS), that faces the disk-shaped recording medium 2. The head slider 10 is floated by the wedge film effect of gas such as air above the rotating disk-shaped recording medium 2. A floating amount Δf of the head slider 10 is decreased recently down to approximately 10 nm or smaller.

The head slider 10 includes a slider substrate 12 having a flat rectangular solid shape made of a sintered member of alumina and titanium carbide (so-called AlTiC), and a thin film portion 14 formed by thin film forming technology on an end surface of the slider substrate 12 on the trailing side. Note that the thickness of the thin film portion 14 in FIG. 2 is exaggerated relatively to that of the slider substrate 12.

A read and write element 14w for reading and writing data is formed in the thin film portion 14. Specifically, the read and write element 14w includes a write element formed of an inductive element that generates a magnetic field corresponding to current flowing in a coil, and a read element formed of a magnetic resistance effect element whose resistance changes in accordance with the received magnetic field.

In addition, a hole portion 14h having an opening 14a on the medium facing surface 10a is formed in the thin film portion 14 at a rear position in the X direction (on the gas inlet side) of the read and write element 14w. A heating element 32 and a reflection portion 43 are disposed in the hole portion 14h. Hereinafter, specific forms of the hole portion 14h, the heating element 32, and the reflection portion 43 are described.

First Example of the Head Slider

Figure 3A:
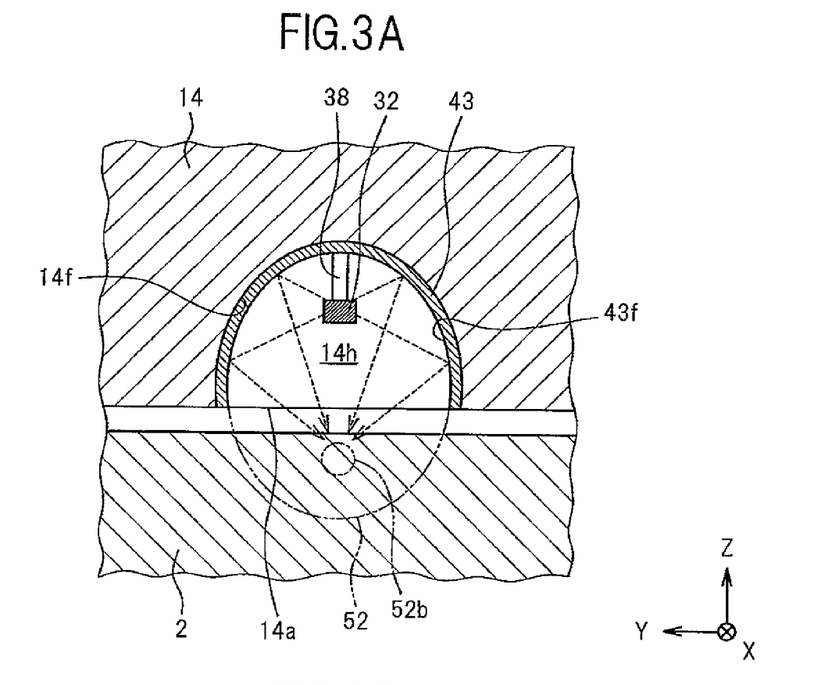
FIG. 3A is a diagram illustrating a cross sectional structure of a first example of the head slider cut in a YZ plane.
Figure 3B:
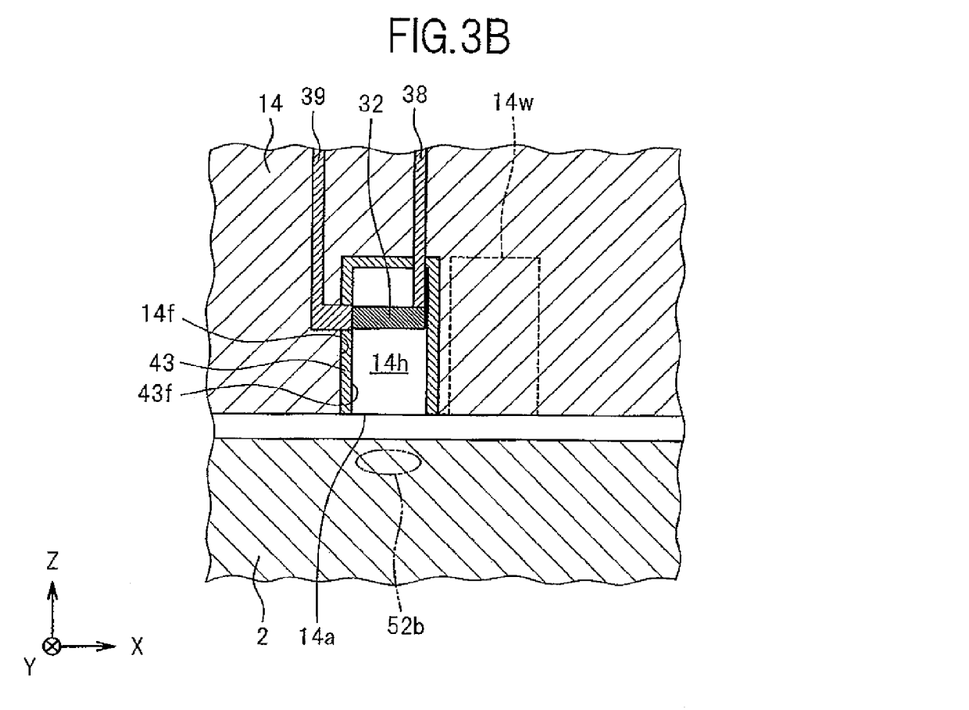
FIG. 3B is a diagram illustrating a cross sectional structure of the first example of the head slider cut in an XZ plane.

FIGS. 3A and 3B are diagrams illustrating cross sectional structures of the head slider 10 according to a first example. These diagrams illustrate cross sectional structures cut in a YZ plane and an XZ plane, respectively, which pass through the heating element 32 and the opening 14a of the hole portion 14h.

The hole portion 14h has an inner surface 14f that is like an elliptic cylindrical surface. The inner surface 14f forms an elliptic curve when cut in the YZ plane, in which the Z direction corresponds to the major axis direction while the Y direction corresponds to the minor axis direction. The hole portion 14h has a depth that is a little longer than a semi-major axis length of the ellipse and is formed like substantially a semicircle portion of the elliptic cylinder.

The reflection portion 43 is made of a metal such as Au having relatively high reflectance. The reflection portion 43 is formed on the entire inner surface 14f of the hole portion 14h, so as to have a reflection surface 43f curved along the inner surface 14f. Therefore, the reflection surface 43f also has the elliptic cylindrical surface forming an elliptic curve when cut in the YZ plane, in which the Z direction corresponds to the major axis direction while the Y direction corresponds to the minor axis direction. In FIG. 3A, a whole circle of elliptic curve 52 is illustrated in a long dashed double-short dashed line.

Figure 6A:
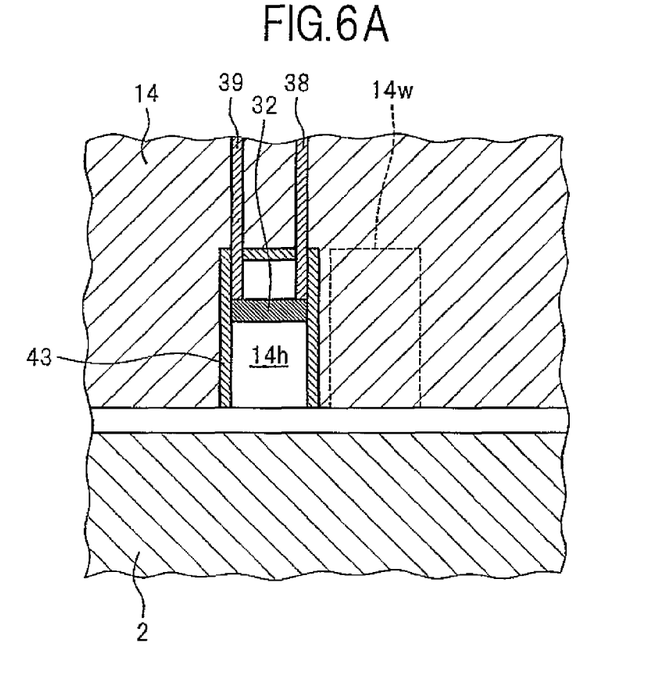
FIG. 6A is a diagram illustrating a variation example of electric wirings connected to a heating element.
Figure 6B:
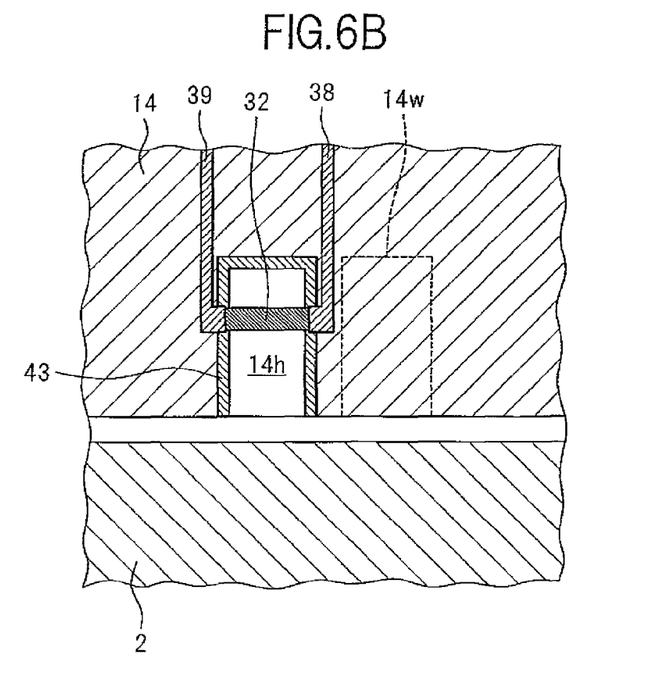
FIG. 6B is a diagram illustrating a variation example of the electric wirings connected to the heating element.

The heating element 32 is an electric heating member made of a metal such as NiCr or W. The heating element 32 is connected to electric wirings 38 and 39 formed in the thin film portion 14, and is supported at a position separated from the reflection surface 43f of the reflection portion 43. The heating element 32 is energized by a control circuit (not shown) of the magnetic disk device 1 so as to be heated. Note that the location of the electric wirings 38 and 39 is not limited to the location illustrated in FIG. 3B but may be the location as illustrated in FIGS. 6A and 6B.

The heating element 32 is positioned at a first focal point that is determined in the hole portion 14h by the elliptic curve 52 formed by the reflection surface 43f of the reflection portion 43. In addition, a second focal point determined outside the hole portion 14h by the elliptic curve 52 is set to be positioned on the disk-shaped recording medium 2. In FIG. 3A, the second focal point 52b is illustrated in a long dashed double-short dashed line.

Therefore, heat (infrared rays) radiated from the heating element 32 is reflected on the reflection surface 43f of the reflection portion 43 and is condensed to the second focal point 52b on the disk-shaped recording medium 2. Thus, a micro area on the disk-shaped recording medium 2 is heated.

In addition, in this example, the reflection surface 43f of the reflection portion 43 forms an elliptic shape in the YZ plane. Therefore, the heat radiated from the heating element 32 can be concentrated in the track width direction of the disk-shaped recording medium 2. In addition, the thin film portion 14 is laminated in the X direction, and hence the hole portion 14h can be formed easily when the X direction corresponds to the thickness direction of the elliptic cylinder.

Note that the shape of the reflection portion 43 is not limited to the elliptic cylindrical shape. However, it is preferable that the curved reflection surface 43f should condense heat to an area narrower than the opening 14a. In addition, the reflection portion 43 may be formed in a part of the inner surface 14f of the hole portion 14h. In this case, it is preferable that the reflection portion 43 should be formed at least on the Z direction side with respect to the heating element 32.

In addition, a thermally transparent member having thermal transparency (optical transparency) for the heat radiated from the heating element 32 may be filled in the hole portion 14h. Examples of the thermally transparent member include $CaF_2$, Si, $SiO_2$, sapphire, and the like.

Figure 7A:
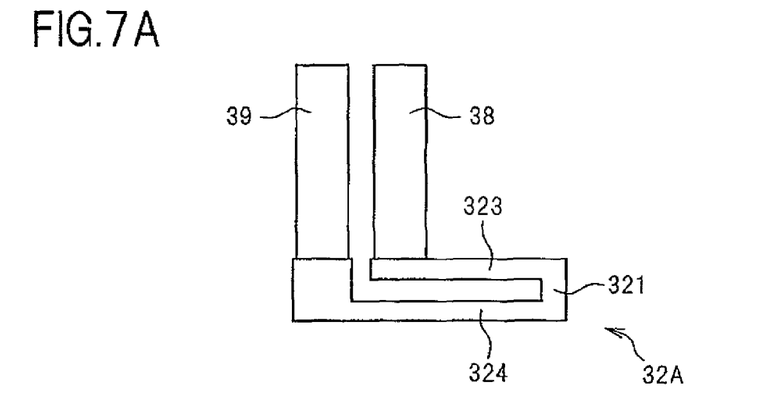
FIG. 7A is a diagram illustrating a variation example of the heating element.
Figure 7B:
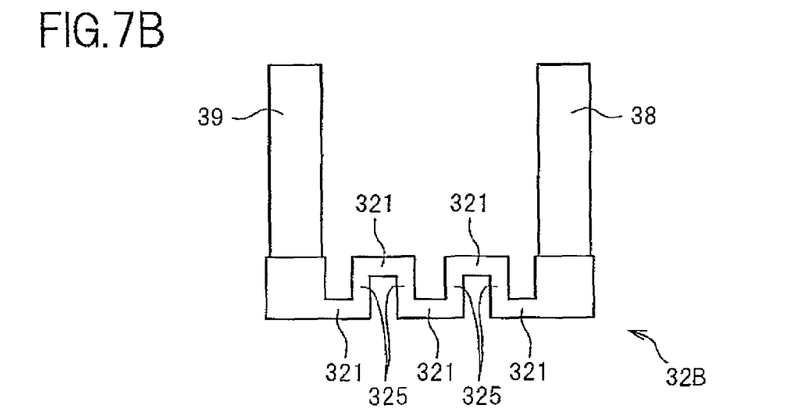
FIG. 7B is a diagram illustrating a variation example of the heating element.
Figure 7C:
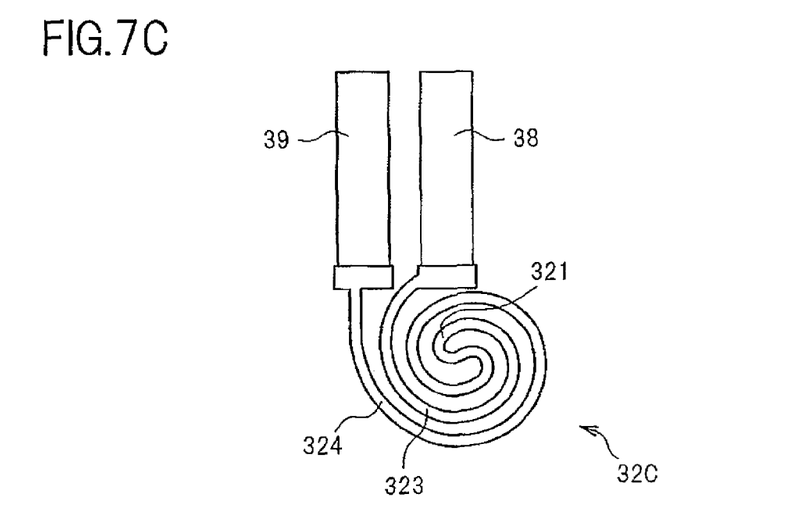
FIG. 7C is a diagram illustrating a variation example of the heating element.

In addition, the shape of the heating element 32 may be a shape as illustrated in FIGS. 7A to 7C. A heating element 32A illustrated in FIG. 7A is formed of a folded linear electric heating member, which includes parallel portions 323 and 324 extending in parallel in the same direction from the individual electric wirings 38 and 39, and a folded portion 321 connecting the parallel portions 323 and 324. Such the parallel portions 323 and 324 can cancel magnetic fields with each other, which are generated therefrom. This is important for the magnetic disk device 1 that reads and writes data magnetically. In addition, the electric heating member becomes relatively long in its path, and hence heat generating ability can be improved.

Further, a heating element 32B illustrated in FIG. 7B is formed of a meandering linear electric heating member, which includes a plurality of parallel portions 325 and a plurality of folded portions 321 connecting the plurality of parallel portions 325. This structure can achieve more effects of canceling the magnetic fields and improving the heat generating ability. A heating element 32C illustrated in FIG. 7C is formed of a folded and coiled linear electric heating member, which includes parallel portions 323 and 324 coiled in parallel and a folded portion 321 connecting the parallel portions 323 and 324. This can also achieve more effects of canceling the magnetic fields and improving the heat generating ability.

Note that according to Wien's displacement law, a peak wavelength of radiation from a black body surface is, for example, 9.56 μm at 30 degrees centigrade. The peak wavelength decreases along with increase in temperature, so as to be 8 μm at 100 degrees centigrade. Therefore, it is preferable that dimensions such as depth and width of the hole portion 14h should be 9 μm or larger. In addition, when the thermally transparent member is filled in the hole portion 14h, a permeating wavelength band of the thermally transparent member should be considered. For instance, if Si is filled in the hole portion 14h, the peak wavelength should be 9 μm or smaller because the permeating wavelength band of Si is 1.3 to 9.01 μm. In this case, temperature of the heating element 32 should be 50 degrees centigrade or higher.

Second Example of the Head Slider

Figure 4A:
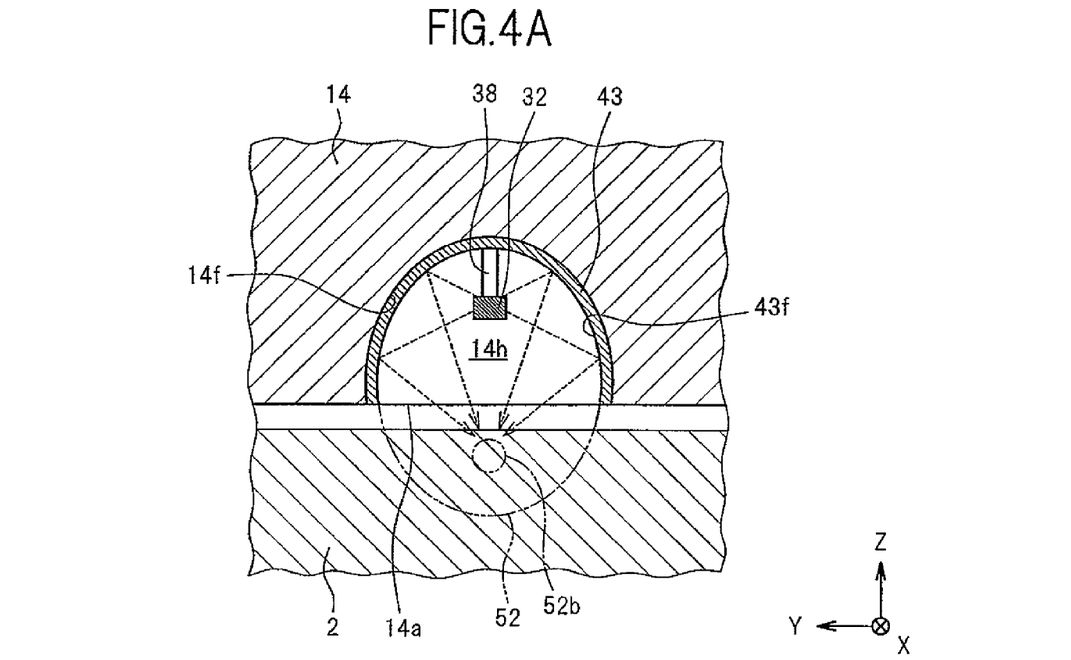
FIG. 4A is a diagram illustrating a cross sectional structure of a second example of the head slider cut in the YZ plane.
Figure 4B:
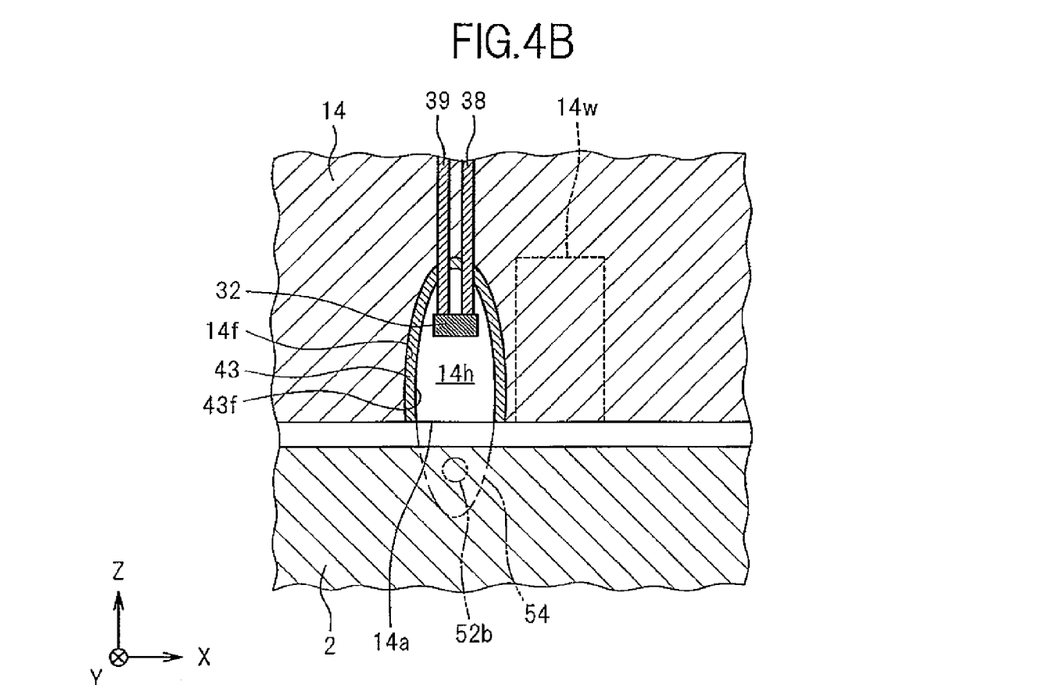
FIG. 4B is a diagram illustrating a cross sectional structure of the second example of the head slider cut in the XZ plane.

FIGS. 4A and 4B are diagrams illustrating cross sectional structures of the head slider 10 according to a second example. These diagrams illustrate cross sectional structures, similarly to the first example described above, cut in the YZ plane and the XZ plane, respectively, which pass through the heating element 32 and the opening 14a of the hole portion 14h. Note that the same structural element as in the first example is denoted by the same numeral so that overlapping description is omitted.

When cut in the YZ plane similarly to the first example, the inner surface 14f of the hole portion 14h and the reflection surface 43f of the reflection portion 43 each form an elliptic curve in which the Z direction corresponds to the major axis direction while the Y direction corresponds to the minor axis direction. In addition, when cut in the XZ plane, the inner surface 14f of the hole portion 14h and the reflection surface 43f of the reflection portion 43 also each form an elliptic curve in which the Z direction corresponds to the major axis direction while the X direction corresponds to the minor axis direction.

Therefore, in addition to the effects of the first example, this example can concentrate the heat radiated from the heating element 32 also in the track direction of the disk-shaped recording medium 2, and hence efficiency of heating the micro area on the disk-shaped recording medium 2 can be improved.

Figure 5A:
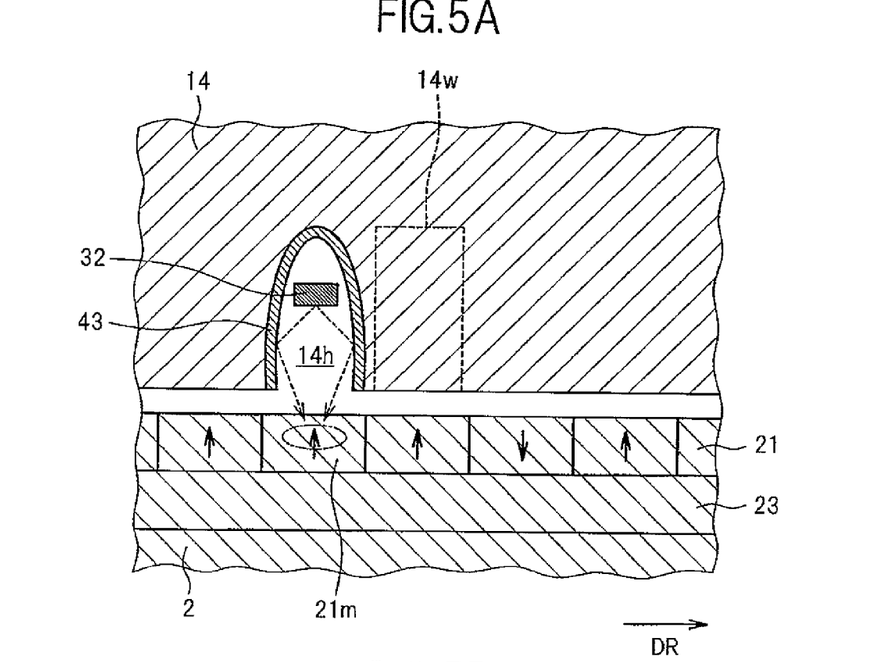
FIG. 5A is a diagram illustrating application of heat by the head slider.
Figure 5B:
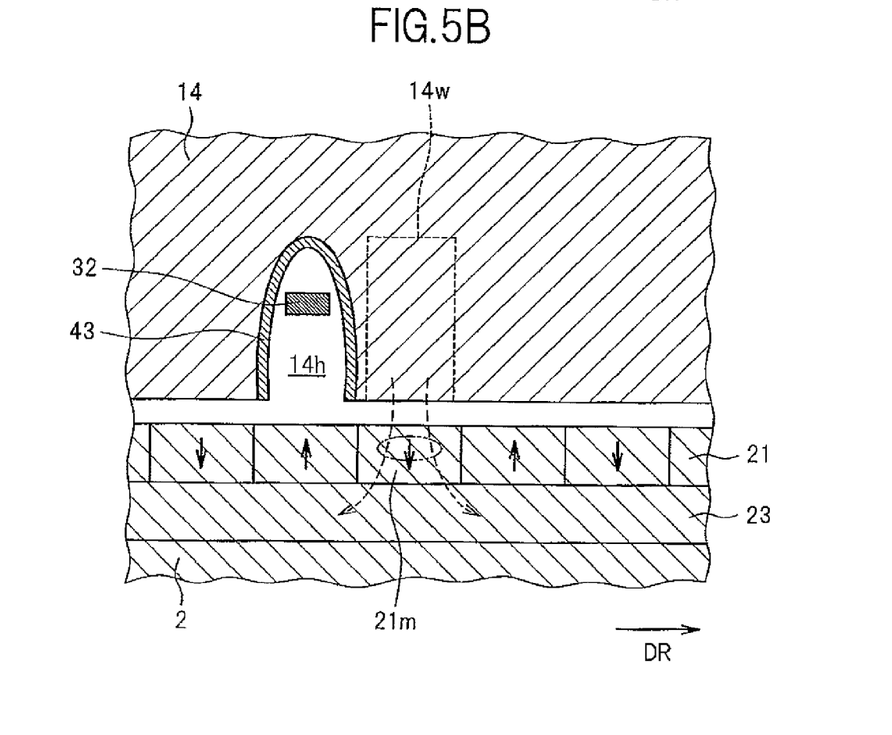
FIG. 5B is a diagram illustrating application of magnetic field by the head slider.

Next, with reference to FIGS. 5A and 5B, application of heat and magnetic field by the head slider 10 is described. In these diagrams, magnetization direction in each micro area 21m constituting a magnetic recording layer 21 is represented by an arrow. In addition, an arrow DR represents the rotation direction of the disk-shaped recording medium 2.

Anyone of the micro areas 21m of the magnetic recording layer 21 is heated first by the heat radiated from the heating element 32 when passing under the hole portion 14h as illustrated in FIG. 5A. Then, the magnetization direction in the heated micro area 21m is reversed by the recording magnetic field generated by the read and write element 14w when passing under the read and write element 14 was illustrated in FIG. 5B. In this way, the recording magnetic field is applied to the micro area 21m in the state of decreased coercivity due to the heating, and hence the magnetization direction can be reversed easily.

Note that a low thermal conductivity layer 23 having lower thermal conductivity than the magnetic recording layer 21 may be disposed under the magnetic recording layer 21 as illustrated in FIGS. 5A and 5B. Thus, diffusion of the heat radiated to the micro area 21m can be prevented.

Simulating Experiment

Hereinafter, a simulating experiment according to the first example illustrated in FIGS. 3A and 3B is described. When the center of the elliptic curve 52 is set to be the origin of YZ coordinates, the elliptic curve 52 is expressed by the following Equation 1. In this Equation 1, a denotes the semi-major axis of the ellipse, b denotes the semi-minor axis thereof, and y and z denote arbitrary points on the elliptic circumference.

$$\frac{z^2}{a^2} + \frac{y^2}{b^2} = 1 \qquad \text{[Equation 1]}$$

Here, coordinates of the first focal point at which the heating element 32 is located are expressed by $(0, (a^2-b^2)^{1/2})$, and coordinates of the second focal point 52b are expressed by $(0, -(a^2-b^2)^{1/2})$.

Further, a thermal flow rate $E_b$ per unit area of radiated heat is expressed by the following Equation 2 based on the Stefan-Boltzmann law. In this Equation 2, σ denotes the Stefan-Boltzmann constant, and T denotes an absolute temperature.

$$E_b = \sigma T^4 \qquad \text{[Equation 2]}$$

Here, if it is supposed that the reflection portion 43 does not exist in the hole portion 14h, radiant energy $q_{1\rightarrow 2}$ propagating from the heating element 32 to the disk-shaped recording medium 2 can be expressed by the following Equation 3 when temperature of the heating element 32 is denoted by $T_1$, and temperature of the second focal point 52b is denoted by $T_2$. In this Equation 3, $\phi_1$ denotes an overall absorption ratio, $S_1$ denotes a surface area of the heating element 32, and $S_2$ denotes a surface area of a part to be heated of the disk-shaped recording medium 2.

$$q_{1\rightarrow 2}=E_1-E_2=\sigma\phi_1(S_1T_1^4-S_2T_2^4) \quad [\text{Equation 3}]$$

In addition, when a temperature rise amount of the disk-shaped recording medium 2 due to the heating is denoted by $\Delta T_3$, the amount $\Delta T_3$ can be expressed by the following Equation 5 based on the following Equation 4.

$$\sigma S_2 \Delta T_3^4 = E_3 = E_1 - E_2 = \sigma\phi_1(S_1T_1^4 - S_2T_2^4) \quad [\text{Equation 4}]$$

$$\Delta T_3 = \sqrt[4]{\frac{\phi_1(S_1T_1^4 - S_2T_2^4)}{S_2}} \quad [\text{Equation 5}]$$

Next, the case where the reflection portion 43 exists in the hole portion 14h is considered. Radiant energy $q_{1\rightarrow 4}$ propagating from the heating element 32 to the reflection surface 43f is expressed by the following Equation 6. In this Equation 6, $S_4$ denotes an area of the reflection surface 43f, and $\Phi_2$ denotes the overall absorption ratio.

$$q_{1\rightarrow 4}=E_1-E_4=\sigma\phi_2(S_1T_1^4-S_4T_4^4) \quad [\text{Equation 6}]$$

In addition, when a temperature rise amount of the reflection portion 43 due to the heating is denoted by $\Delta T_5$, the amount $\Delta T_5$ can be expressed by the following Equation 8 based on the following Equation 7.

$$\sigma S_4 \Delta T_5^4 = E_5 = E_1 - E_4 = \sigma\phi_2(S_4T_1^4 - S_4T_4^4) \quad [\text{Equation 7}]$$

$$\Delta T_5 = \sqrt[4]{\frac{\phi_2(S_4T_1^4 - S_4T_4^4)}{S_4}} \quad [\text{Equation 8}]$$

In addition, radiant energy $q_{4\rightarrow 2}$ propagating from the reflection portion 43 to the disk-shaped recording medium 2 is expressed by the following Equation 9. In this Equation 9, $\Phi_3$ denotes the overall absorption ratio, and $\delta$ denotes reflectance of heat by the reflection portion 43.

$$q_{4\rightarrow 2}=(E_4+E_5)-(E_2+E_3)=\sigma\phi_3(\delta S_4(T_4+\Delta T_5)^4-S_4T_2^4) \quad [\text{Equation 9}]$$

Then, when a temperature rise amount of the disk-shaped recording medium 2 due to a total radiant energy $q_{1\rightarrow 2}+q_{4\rightarrow 2}$ is denoted by $\Delta T_6$, this amount $\Delta T_6$ can be expressed by the following Equation 11 based on the following Equation 10.

$$\sigma S_2 \Delta T_6^4 = q_{i\rightarrow 2} + q_{4\rightarrow 2} \quad [\text{Equation 10}]$$
$$= \sigma\phi_1(S_1T_1^4 - S_2T_2^4) + $$
$$\sigma\phi_3(\delta S_4(T_4 + \Delta T_5)^4 - S_4T_2^4)$$

$$\Delta T_6 = \sqrt[4]{\frac{\phi_1(S_1T_1^4 - S_2T_2^4) + \phi_3(\delta S_4(T_4 + \Delta T_5)^4 - S_4T_2^4)}{S_2}} \quad [\text{Equation 11}]$$

Here, for example, it is supposed that temperature of the heating element 32 is 100 degrees centigrade, and a surface area of the same is 10 μm², i.e., 10 μm in the X-axis direction and 1 μm in the Y-axis direction. It is supposed that initial temperature of the part to be heated of the disk-shaped recording medium 2 is 23 degrees centigrade, and a surface area of the same is 10 μm², i.e., 10 μm in the X-axis direction and 1 μm in the Y-axis direction. It is supposed that initial temperature of the reflection portion 43 is 23 degrees centigrade, the semi-major axis is 100 μm, and the semi-minor axis is 50 μm. In addition, it is supposed that the second focal point 52b is at a position having a depth of 5 nm from the surface of the disk-shaped recording medium 2, and the floating amount $\Delta f$ of the head slider 10 is 5 nm. It is supposed that the reflection portion 43 is formed so that z has a value within a range of −86.6 to 100 μm. In this case, the surface area of the reflection portion 43 $S_4$ is approximately 3,900 μm². In addition, it is supposed that the overall absorption ratio without the reflection portion 43 is 0.9 while the overall absorption ratio $\Phi_2$ and $\Phi_3$ with the reflection portion 43 are 0.928 and 0.32, respectively. In addition, it is supposed that the reflection portion 43 is made of Au having a reflectance of 0.97. In this case, a temperature rise amount $\Delta T_3$ of the disk-shaped recording medium 2 without the reflection portion 43 is expressed by the following Equation 12 based on the above-mentioned Equation 5. On the other hand, a temperature rise amount $\Delta T_6$ of the disk-shaped recording medium 2 with the reflection portion 43 is expressed by the following Equation 13 based on the above-mentioned Equation 11.

$$\Delta T_3 = \sqrt[4]{\frac{\phi(S_1T_1^4 - S_2T_2^4)}{S_2}} \quad [\text{Equation 12}]$$
$$= \sqrt[4]{\frac{0.9*(10*373^4 - 10*296^4)}{10}}$$

$$\Delta T_3 \approx 47.2 \; [° \text{C.}]$$

$$\Delta T_6 = \sqrt[4]{\frac{\phi_1(S_1T_1^4 - S_2T_2^4) + \phi_3(\delta S_4(T_4 + \Delta T_5)^4 - S_4T_2^4)}{S_2}} \quad [\text{Equation 13}]$$

$$\Delta T_6 \approx 75.7 \; [° \text{C.}]$$

Thus, the temperature rise amount is different between the case with the reflection portion 43 and the case without the reflection portion 43 by approximately 1.6 times. The temperature rise amount $\Delta T_6$ of the disk-shaped recording medium 2 in the case with the reflection portion 43 is sufficient for performing the thermally assisted magnetic recording.

The embodiment of the present invention is described above, but the present invention is not limited to the above-mentioned embodiment, which can be modified variously and easily for a person skilled in the art. For instance, the position of the hole portion 14h may be closer to the gas outlet side than the read and write element 14w is. In this case, the heating element 32 is closer to the disk-shaped recording medium 2, and hence the disk-shaped recording medium 2 can be easily heated. In addition, the position of the hole portion 14h may be between the write element and the read element of the read and write element 14w. In this case, the heating element 32 is further closer to the write element, and hence the heating amount of the disk-shaped recording medium 2 can be increased.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A head slider, which is floated above a recording medium, for writing data, comprising:
   a medium facing surface facing the recording medium;
   a hole portion having an opening in the medium facing surface;
   a heating element disposed in the hole portion, the heating element being heated through energization; and
   a reflection portion disposed in the hole portion, the reflection portion reflecting heat radiated from the heating element toward the recording medium.

2. A head slider according to claim 1, wherein the reflection portion is formed at least on a farther side from the recording medium with respect to the heating element in the hole portion.

3. A head slider according to claim 1, wherein the reflection portion is formed on an inner surface of the hole portion.

4. A head slider according to claim 1, wherein the heating element is formed separately from an inner surface of the hole portion.

5. A head slider according to claim 1, wherein the reflection portion has a curved reflection surface that condenses the heat radiated from the heating element to an area narrower than the opening of the hole portion.

6. A head slider according to claim 1, wherein a reflection surface of the reflection portion forms an elliptic curve on a cross section cut in a plane passing through the heating element and the opening of the hole portion, in which a direction from the heating element to the recording medium corresponds to a major axis direction of the elliptic curve.

7. A head slider according to claim 6, wherein the reflection surface forms the elliptic curve on the cross section cut in the plane passing through the heating element and the opening of the hole portion along a moving direction of the head slider relatively to the recording medium.

8. A head slider according to claim 6, wherein the reflection surface forms the elliptic curve on the cross section cut in the plane passing through the heating element and the opening of the hole portion along a direction crossing a moving direction of the head slider relatively to the recording medium.

9. A head slider according to claim 6, wherein the reflection surface is formed into an elliptic cylindrical surface.

10. A head slider according to claim 6, wherein the heating element is disposed at a position of a first focal point determined in the hole portion by the elliptic curve.

11. A head slider according to claim 10, wherein a second focal point determined outside the hole portion by the elliptic curve is positioned on the recording medium.

12. A head slider according to claim 1, wherein:
    an inner surface of the hole portion forms an elliptic curve on a cross section cut in a plane passing through the heating element and the opening of the hole portion, in which a direction from the heating element to the recording medium corresponds to a major axis direction of the elliptic curve; and
    the reflection portion is formed along the inner surface of the hole portion.

13. A head slider according to claim 1, wherein the hole portion is formed on a front side with respect to a position where data is written in a moving direction of the head slider relatively to the recording medium.

14. A head slider according to claim 1, wherein the heating element includes a linear electric heating member including at least parallel portions connected by a folded portion.

15. A head slider according to claim 1, wherein the heating element includes a meandering linear electric heating member.

16. A head slider according to claim 1, further comprising a thermally transparent member that has thermal transparency for the heat radiated from the heating element and is filled in the hole portion.

17. A head assembly comprising the head slider according to claim 1.

18. A magnetic disk device comprising the head assembly according to claim 17.

19. A magnetic disk device according to claim 18, further comprising a disk-shaped recording medium including a low thermal conductivity layer having thermal conductivity lower than thermal conductivity of a magnetic recording layer in which data is written, under the magnetic recording layer.

* * * * *